(12) United States Patent
Collins et al.

(10) Patent No.: US 7,615,160 B2
(45) Date of Patent: Nov. 10, 2009

(54) WATER DISINFECTION APPARATUS

(75) Inventors: Duncan Alexander Collins, Cookham (GB); Jeremy Philip Meier, Streatley (GB)

(73) Assignee: Severn Trent Water Purification, Inc., Colmar, PA (US)

( * ) Notice: Subject to any disclaimer, the term of this patent is extended or adjusted under 35 U.S.C. 154(b) by 0 days.

(21) Appl. No.: 11/711,456

(22) Filed: Feb. 27, 2007

(65) Prior Publication Data
US 2007/0284315 A1 Dec. 13, 2007

(51) Int. Cl.
C02F 1/32 (2006.01)
A61L 2/10 (2006.01)
(52) U.S. Cl. .......................... 210/748; 210/542
(58) Field of Classification Search .......... 210/748, 210/600, 562; 250/504 R, 431
See application file for complete search history.

(56) References Cited
U.S. PATENT DOCUMENTS
4,367,410 A 1/1983 Wood

2003/0122092 A1 7/2003 Sarchese et al.
2004/0195954 A1 10/2004 Pirovic
2004/0232358 A1* 11/2004 Moruzzi ................. 250/504 R

FOREIGN PATENT DOCUMENTS

| EP | 0893411 | 1/1999 |
|---|---|---|
| GB | 2413005 | 10/2005 |
| WO | WO 00/32244 A1 | 6/2000 |
| WO | WO 01/09924 A1 | 2/2001 |
| WO | WO 03/021632 A2 | 3/2003 |
| WO | WO 03/021632 A3 | 3/2003 |

OTHER PUBLICATIONS

EPO Communication, Jan. 5, 2009.

* cited by examiner

*Primary Examiner*—Walter D Griffin
*Assistant Examiner*—Cameron J Allen
(74) *Attorney, Agent, or Firm*—D'Ambrosio & Associates, PLLC; Jo Katherine D'Ambrosio; Usha Menon

(57) ABSTRACT

There is described a water disinfection apparatus comprising a channel for defining a flow of water, and plural ultraviolet light sources, each comprising an elongate ultraviolet lamp unit comprising at least one ultraviolet bulb and defining an elongate lamp unit axis; and a microwave unit comprising a microwave energy source for exciting the at least one ultraviolet bulb. In use, at least part of the elongate lamp unit encounters the flow of water.

20 Claims, 6 Drawing Sheets

WATER DISINFECTION APPARATUS

PRIORITY CLAIM

This application claims priority to European Patent Application Serial No. EP06123520 filed Nov. 6, 2006, entitled "Water Disinfection Apparatus."

FIELD OF THE INVENTION

The present invention is in the field of water disinfection apparatus, in which water to be disinfected (e.g., sterilized) flows past an ultraviolet (UV) light source.

BACKGROUND OF THE INVENTION

It is known to use ultraviolet (UV) radiation in disinfection systems for use in the cleaning up of water. The UV radiation acts to kill bacteria and germs.

Known systems employ microwave energy to excite the source of UV radiation. One problem with such systems is that it is difficult to efficiently provide sufficient excitation energy to the UV source and difficult to effectively transfer that energy to the water to be treated. It is, therefore, difficult to arrange apparatus for high throughput industrial water treatment purposes.

There is now described a water disinfection apparatus that enables efficient, high throughput UV water disinfection treatment to be conducted. The apparatus comprises plural ultraviolet light sources, each of which comprises a UV lamp that is excited by a microwave energy source; and a channel for channeling water past the UV lamp. The UV lamp is arranged perpendicular to the water flow and is suitably enclosed by a waveguide comprising UV transparent material.

The water disinfection apparatus of the present invention have been found to provide enhanced efficacy (e.g., enhanced water disinfecting capability) and lower operational costs.

SUMMARY OF THE INVENTION

According to one aspect of the present invention, there is provided a water disinfection apparatus comprising:
 (a) a channel for defining a flow of water;
 (b) plural ultraviolet light sources, each comprising:
  (i) an elongate ultraviolet lamp unit comprising at least one ultraviolet bulb and defining an elongate lamp unit axis; and
  (ii) a microwave unit comprising a microwave energy source for exciting the at least one ultraviolet bulb,
 wherein, in use, at least part of the elongate lamp unit encounters the flow of water and the elongate lamp unit axis is perpendicular to the flow of water.

Another aspect of the invention includes a method of disinfecting a water-containing liquid comprising: providing a disinfection apparatus; and placing the water-containing liquid into said channel and in contact with said plurality of ultraviolet light sources.

BRIEF DESCRIPTION OF THE DRAWINGS

Particular embodiments of the ultraviolet light source in accord with the present invention will now be described with reference to the accompanying drawings in which:

FIG. 4b shows a cross-sectional view of the ultraviolet light source of FIG. 3b taken along Section A-A of FIG. 4a.

DETAILED DESCRIPTION OF THE INVENTION

There is provided an apparatus that is suitable for use in the disinfection of water by means of ultraviolet irradiation.

The apparatus comprises a channel, which in use, defines a flow of water to be treated. The channel may be defined by any suitable means and is suitably open to the environment. In the embodiments, the channel is defined by a ditch or trough arrangement, which is suitably comprised of concrete material. The water flow may be arranged to be pumped or to flow under gravity.

The apparatus comprises plural ultraviolet light sources. Each of the plural ultraviolet light sources comprises (i) an elongate ultraviolet lamp unit comprising at least one ultraviolet bulb and defining an elongate lamp unit axis; and (ii) a microwave unit comprising a microwave energy source for exciting the at least one ultraviolet bulb.

The microwave energy source provides microwave energy to excite the ultraviolet bulb. Suitably, the microwave energy source comprises a magnetron or other suitable microwave-producing device.

In particular embodiments, the microwave energy source provides a continuous (i.e., non-pulsed) stream of microwave energy. In other embodiments, the microwave energy source provides pulsed microwave energy to excite the ultraviolet bulb. Suitably, the pulsed microwave energy source is pulsed with pulse widths ranging from 100 milliseconds to 0.5 microseconds, preferably from 10 milliseconds to 5 microseconds. Suitably, the pulsed microwave energy source has a pulse period of from 100 milliseconds to 0.5 microseconds, preferably from 5 milliseconds to 50 microseconds. Suitably, the pulsed microwave energy source is pulsed at a frequency of from 2 MHz to 10 Hz. Optimization of both pulse width and pulse period is preferred.

In particular embodiments, the UV lamp may be excited by both a continuous (i.e., non-pulsed) microwave energy source and a pulsed microwave energy source. Suitably, the peak energy value of pulsed excitation is significantly higher than that of the peak energy value of continuous excitation. Typical peak energy ratios are from 1:10 to 1:100 for continuous pulsed energy levels. In one example, the lamp is excited at a steady state by a continuous 100 watt energy source and pulsed at up to 3,000 watts by a pulsed excitation source. In yet other embodiments, the ultraviolet light source is arranged for the emission of either monochromatic or polychromatic ultraviolet radiation.

The dominant wavelength of the ultraviolet light source is selected according to the particular water disinfection application for which the light source is to be used. Typically, the dominant wavelength of the ultraviolet light source is from 160 nm to 370 nm. In particular embodiments, the dominant wavelength of the ultraviolet light source is from 240 nm to 310 nm, particularly 254 nm. Such wavelengths have been found to be particularly useful for water disinfection or purification applications.

The at least one ultraviolet bulb can have any suitable shape and size, but preferably has an elongate form such as a cylindrical form or cigar shape. Typical bulb diameters can be from 5 to 200 mm, preferably from 10 to 40 mm, for example, 22 mm.

In a particular embodiment, the elongate ultraviolet lamp unit comprises plural ultraviolet bulbs. The ultraviolet bulbs may be similar in type, e.g., of similar size and operating temperature, or combinations of different bulb types may be employed. The number of ultraviolet bulbs employed can be tailored to the purpose of use. Typically, the elongate ultraviolet lamp unit comprises from 2 to 25, preferably from 3 to 18 ultraviolet bulbs.

Various forms of arrangement of the plural ultraviolet bulbs are envisaged, including random or informal arrangements, side-by-side arrangements, sequential arrangements, array arrangements and clusters. The ultraviolet bulbs may be arranged in serial, parallel or mixed serial and parallel electrical circuit arrangements. In particular embodiments, the plural ultraviolet bulbs are elongate and arranged in a side-by-side arrangement.

Suitably, the at least one ultraviolet bulb has an operating temperature that maximizes the chosen bulb characteristics. Typical operating temperatures are from 10° C. to 900° C., for example, 40° C. to 200° C., and the operating temperature will be selected and optimized according to the purpose of use.

In other embodiments, the at least one ultraviolet bulb has no electrode. That is to say, it is an electrode-less bulb, such as one comprising a partially evacuated tube comprising an element or mixtures of elements in vapor form. Mercury is a preferred element for this purpose, but alternatives include mixtures of inert gases with mercury compounds, sodium and sulphur. Halides, such as mercury halide, are also suitable herein. Amalgams are also suitable herein, including indium/mercury amalgam.

Inevitably, such electrode-less bulbs emit a spectrum of wavelengths, dependent on the chemical nature of the core element or elements. Embodiments employing multiple lamps of different spectrum characteristics are envisaged herein. Suitably, the peak operating energy of each ultraviolet bulb is from 100 watts to 100,000 watts, preferably from 500 watts to 30,000 watts.

In use, at least part of the elongate lamp unit encounters the flow of water. In some embodiments, none of the microwave unit encounters the flow of water. The microwave unit can be suitably powered by a power source (e.g., battery or main power source) and, preferably, the flow of water does not contact the power source.

The elongate lamp unit axis is perpendicular to the flow of water, which generally flows horizontally in a direction defined by the channel. This contrasts with typical prior art arrangements, in which the flow of water is along the elongate lamp axis. Suitably, the elongate lamp unit axis is a vertical axis (i.e., vertically oriented). An advantage of such vertical orientation is that the microwave unit and all electrical connections thereto including, e.g., the power source, may be positioned wholly above the water line such that in use, these do not encounter the flow of water.

In particular embodiments, the water disinfection apparatus is provided with one or more baffles for directing water flow to at least one elongate lamp unit. The baffles may have any suitable size or shape. Suitably, the one or more baffles are arranged in spaced fashion (e.g., radially spaced) around the at least one elongate lamp unit.

In other embodiments, the baffles comprise elongate (e.g., elongate cylindrical) elements, and the elongate baffles are arranged parallel to the elongate lamp axis of each elongate lamp unit. Thus, when the at least one elongate lamp unit is arranged vertically, the baffles are also arranged vertically.

Where the baffles are elongate cylindrical elements, the space within the cylinder may, in particular embodiments, be used to provide other functions and/or house other elements of the apparatus herein. Thus, in some embodiments, one or more of the baffles comprise an air pipe element of an air cooling system (as described in more detail hereinafter). In other embodiments, one or more of the baffles houses a lead screw of a moveable wiper system herein (as described in more detail hereinafter).

In certain embodiments, the elongate ultraviolet lamp unit comprises an optically transparent waveguide for guiding microwave energy originating from the microwave energy source to the at least one ultraviolet bulb, wherein the waveguide wholly surrounds the at least one ultraviolet bulb.

Applicants' PCT Patent Applications Nos. WO 00/32244, WO 01/09924 and WO03/021,632, each of which is incorporated herein by reference, describe ultraviolet light sources in which an optically transparent waveguide wholly surrounds at least one ultraviolet bulb. By "optically transparent waveguide," it is meant a waveguide that is substantially transparent to the ultraviolet radiation employed herein, typically having a transparency of greater than 50%, preferably greater than 90%, to UV radiation. The optically transparent waveguide controls the flow of ultraviolet radiation therefrom. The control function typically includes the prevention of the release of harmful or unnecessary ultraviolet radiation frequencies.

In other embodiments, the optically transparent waveguide is provided with a sleeve (e.g., a quartz sleeve) and the material of that sleeve is selected to preferentially allow different wavelengths of UV radiation to escape. The exact nature of the optically transparent waveguide and its control function can be tailored to fit the purpose of use.

In yet other embodiments, the waveguide controls the flow of microwave energy therefrom. Control of the microwave energy that passes through the waveguide is useful in embodiments of the invention that make use of both UV and microwave radiation. In certain other embodiments, the waveguide may block at least the majority of the flow of microwave energy therefrom. In other embodiments, the optically transparent waveguide comprises a sleeve comprised of quartz or a UV-transparent plastic material. In general, a sleeved waveguide will be cylindrical in form.

Different configurations of optically transparent waveguide and sleeve can be envisaged. In one aspect, the optically transparent waveguide is rectangular in form and has a quartz sleeve provided therearound. In another aspect, the optically transparent waveguide is cylindrical in form (e.g., comprised of a metallic screen or mesh). Rectangular quartz-sleeved waveguides are, in general, more expensive than cylindrical mesh waveguides.

In particular embodiments, the optically transparent waveguide or any sleeve therefor can be coated with a coating that assists in controlling the flow of ultraviolet and/or microwave energy therefrom. The coating may be applied to either or both of the inner or outer surfaces of the waveguide. Partial coatings are also envisaged.

In other embodiments, the optically transparent waveguide or any sleeve therefor can comprise a conducting material. The conducting material may be integral or applied as an internal or external coating or liner. The liner may directly contact the inner surface of the optically transparent waveguide or be spaced therefrom.

In certain embodiments, any sleeve for the optically transparent waveguide and/or the ultraviolet bulb can be coated with a coating that assists in modifying the wavelength of emitted light. In other embodiments, the optically transparent waveguide can be constructed to ensure control of the escape of microwave energy. For example, the waveguide can be adapted to include different hole spacings, wire thicknesses and overall configurations.

In some embodiments, the waveguide comprises a conducting mesh. Preferably, the conducting mesh comprises a high frequency conducting material selected from the group consisting of copper, aluminum and stainless steel.

In other embodiments, the elongate ultraviolet lamp unit can be provided with an air inlet and an air outlet arranged for directing an air flow from the air inlet to the air outlet and past the at least one ultraviolet bulb. The air flow is typically arranged for cooling of the ultraviolet bulbs in use to achieve a more constant operating temperature.

The Applicants have found that the use of such an air cooling system is particularly important for open channel systems in which the water level (i.e., the level of the water flow) may vary over any usage period with the effect that the length of the elongate ultraviolet lamp unit that encounters the water flow also varies. The water flow has a cooling effect on the elongate ultraviolet lamp unit, and in the absence of a cooling air flow, this water cooling effect will also vary over time, which can lead to problems of lamp over-heating when water flow levels are low. The air flow provides for cooling, and hence more constant lamp operating temperature, even when water flow levels are low.

In particular embodiments, the water disinfection apparatus additionally comprises an air pump unit for pumping air to the air inlet of the elongate ultraviolet lamp unit to define a cooling air flow past the at least one ultraviolet bulb. Alternatively, the water disinfection apparatus additionally may comprise an air convector unit to define a cooling convection air flow past the at least one ultraviolet bulb.

In other embodiments, the water disinfection apparatus can comprise at least one ultraviolet light source assembly unit, each assembly unit comprising an assembly of the plural ultraviolet light sources. Suitably, each ultraviolet light source assembly unit comprises from two to six (e.g., four) ultraviolet light sources.

In certain embodiments, the water disinfection apparatus can comprise plural ultraviolet light source assembly units arranged in series along the direction of the flow of water. The apparatus may, therefore, be supplied and employed in modular fashion with different numbers and arrangements of (modular) assembly units employed depending upon the desired operating characteristics and water flow.

In other embodiments, the water disinfection apparatus additionally may comprise a cleaning system for cleaning the elongate ultraviolet lamp unit. Suitable cleaning systems can include those based upon fluid flow, such as flow of water, air or gas. Cleaning agents such as detergents may be employed, as necessary.

In yet another embodiment, the cleaning system includes a wiper movable along the one or more elongate ultraviolet lamp unit(s). The wiper may, for example, be provided with a wiping brush surface, such as one comprised of stainless steel brush elements. Where the apparatus has vertically oriented elongate ultraviolet lamp units, the wiper is suitably movable to a "parking" position, in which it rests above the water line and, therefore, cannot be fouled by anything in the flow of water when in that "parking" position.

In other embodiments, the ultraviolet light source additionally can comprise a pathguide to guide the microwave energy from the microwave energy source to the ultraviolet bulb. In one embodiment, the pathguide can define an essentially linear path for the microwave energy. In another embodiment, the pathguide may define a non-linear path such as a path defining an angle, such as a right angle. In some embodiments, the pathguide comprises a coaxial cable.

The choice of materials for use in the water disinfection apparatus and in any fluid flow piping arrangements can be important. Typically, the materials will be selected that are resistant to corrosion and that do not leach contaminants to the system. Seal materials are also carefully selected with typical seal materials including CHEMRAZ, TEFLON, encapsulated VITON and GORE-TEX.

According to another aspect of the present invention, there is provided a method of use of the water disinfection apparatus described herein for disinfecting a water-containing liquid. Suitably, the water-containing liquid may be selected from the group consisting of water for human consumption, waste water and sewage water.

One particular application is in the clean up of ballast seawater from the holds of ships wherein contaminants in the ballast water are dissociated by application of ultraviolet radiation. Another particular application is in the dissociation of organic material, such as Total Oxidizable Carbon (TOC) in rinse water for use in the electronics, semiconductors, pharmaceuticals, beverage, cosmetics and power industries. The process involves the production of OH• radicals that oxidize any hydrocarbon molecules in the rinse water. Optionally, other oxidants may be employed such as ozone and hydrogen peroxide. Typically, polishing deionization beds, featuring nuclear-grade resin materials, are placed downstream of the TOC reduction units to remove any ionized species and restore the resistivity of the water.

The present invention is now described by means of examples, which constitute possible embodiments of the invention.

Figure 1:
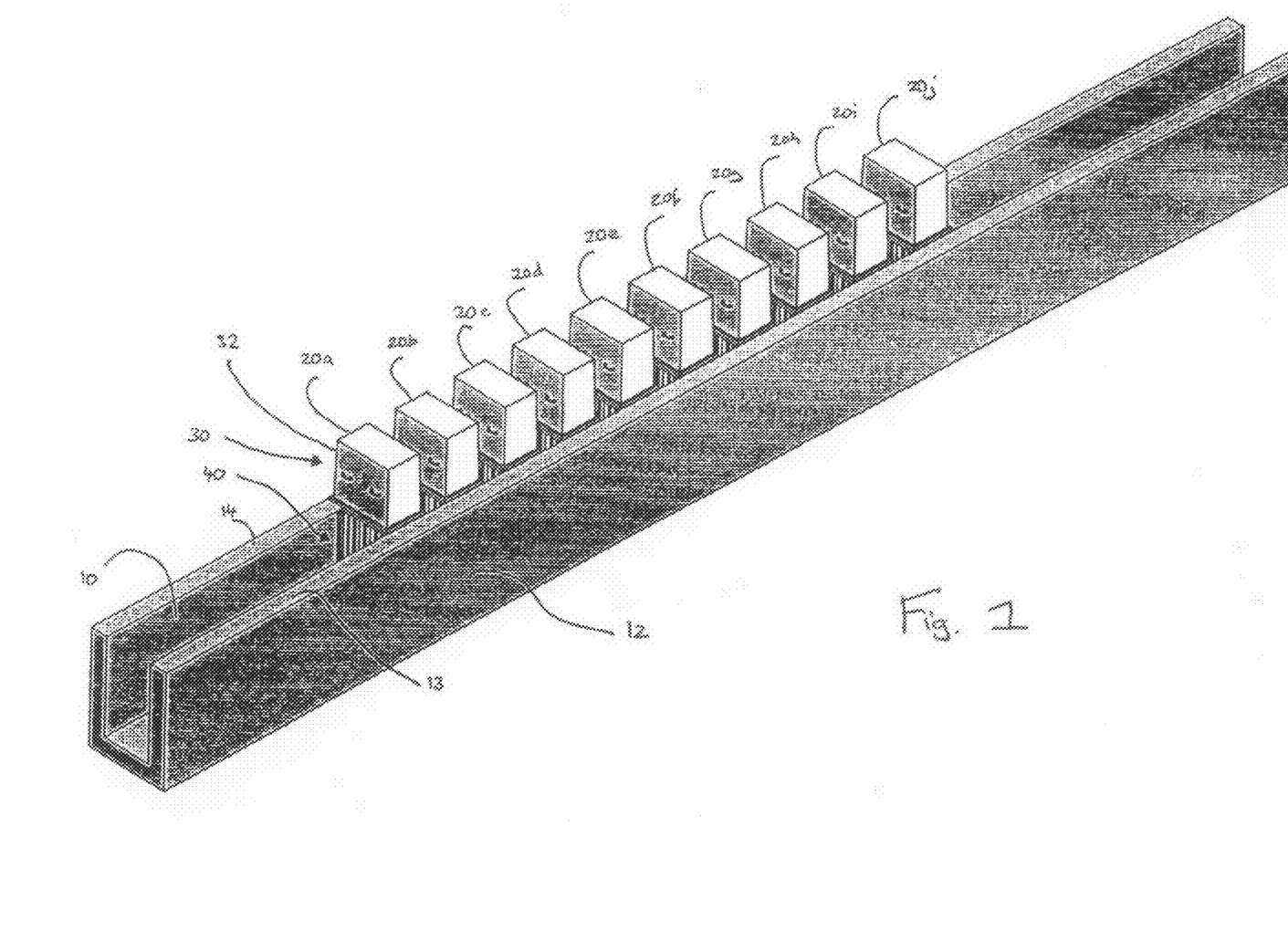
FIG. 1 is a perspective view of a water disinfection apparatus herein.

Referring now to the drawings, FIG. 1 shows an embodiment of a representative water disinfection apparatus herein comprising a water channel 10 defined by a concrete ditch 12 for directing a flow of water to be treated. The walls of the concrete ditch define ledges 13, 14, and the ditch 12 is arranged for receipt of a series arrangement of ten ultraviolet light source assembly units 20a-20j there along.

Each of the ultraviolet light source assembly units 20a-20j (only one labeled in detail) comprises a microwave assembly unit 30, which contacts ledges 13, 14 and lies above the water channel 10, and an elongate ultraviolet lamp assembly unit 40, which extends vertically down into the water channel 10. Each microwave assembly unit 30 is provided with a removable cover 32.

In use, a flow of water to be treated is directed along the water channel 10. It may, therefore, be appreciated that at least part of the elongate lamp assembly unit 40 will encounter the flow of water for treatment thereof with ultraviolet radiation, and also that the microwave assembly unit 30 will not encounter the flow of water.

A better understanding of the detailed structure of each ultraviolet light source assembly unit 20a to 20j may be obtained by reference to FIGS. 3a to 4b, which show various views of a particular embodiment of a suitable ultraviolet light source assembly unit 20 differing only from those shown in FIG. 1 in that the cover 32 has been removed to show the inner details of the microwave assembly unit 30.

Figure 2:
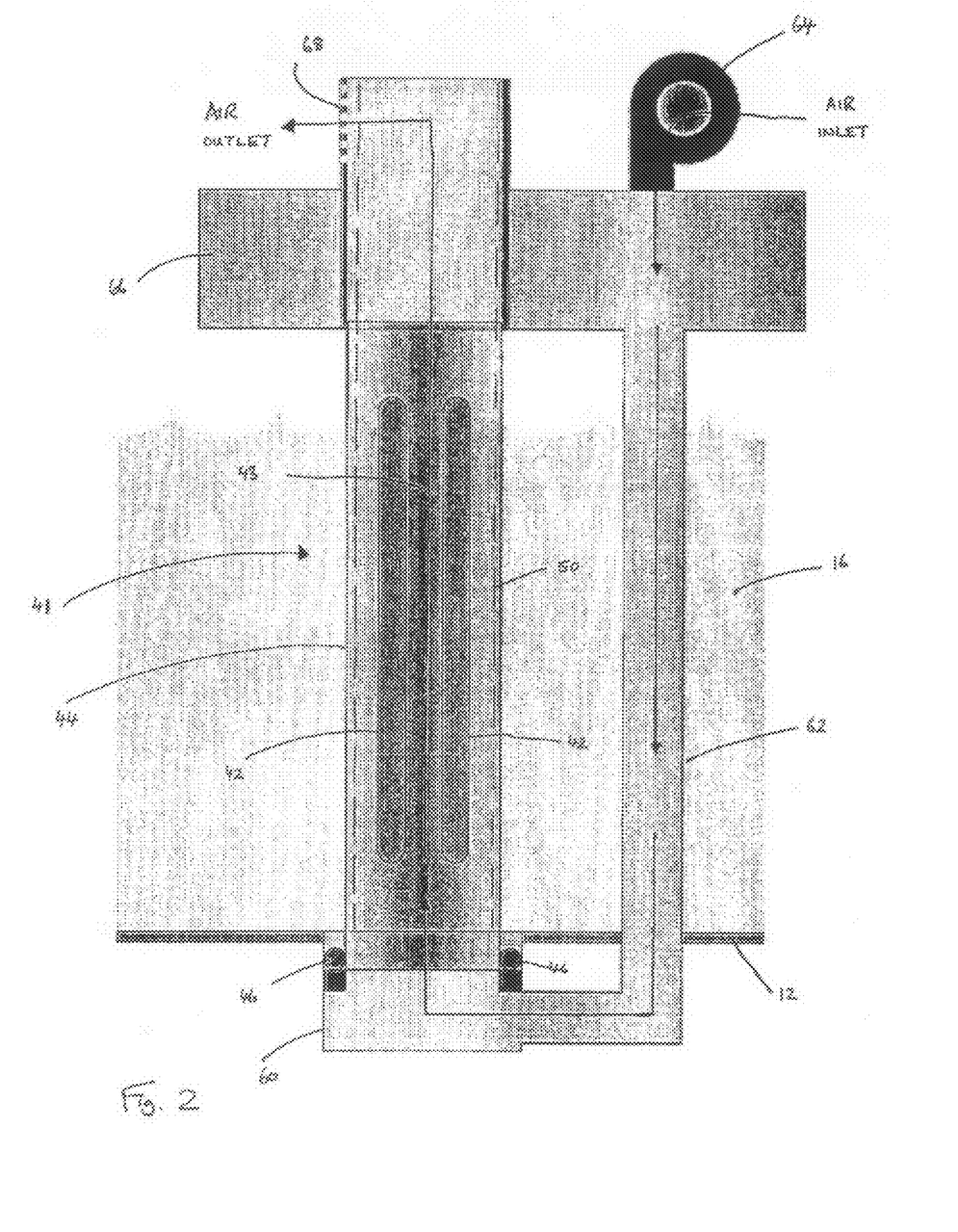
FIG. 2 is a cross-sectional view of a schematic representation of an elongate ultraviolet light unit of an ultraviolet light source suitable for use with a water disinfection apparatus herein.
Figure 3A:
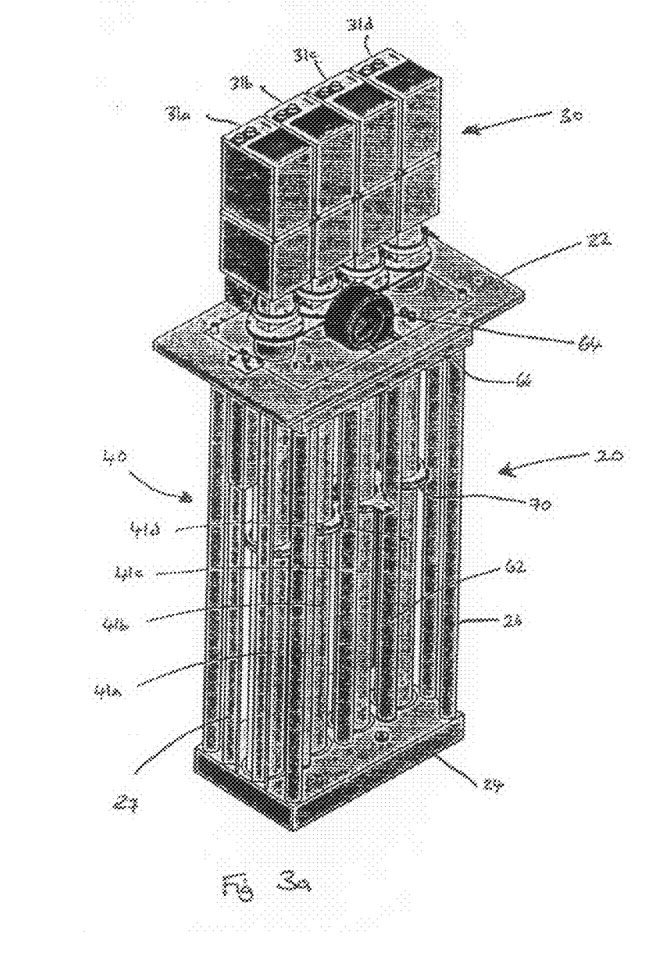
FIGS. 3a to 3c show perspective views from the front, back and side of an ultraviolet light source suitable for use with a water disinfection apparatus herein.
Figure 3B:
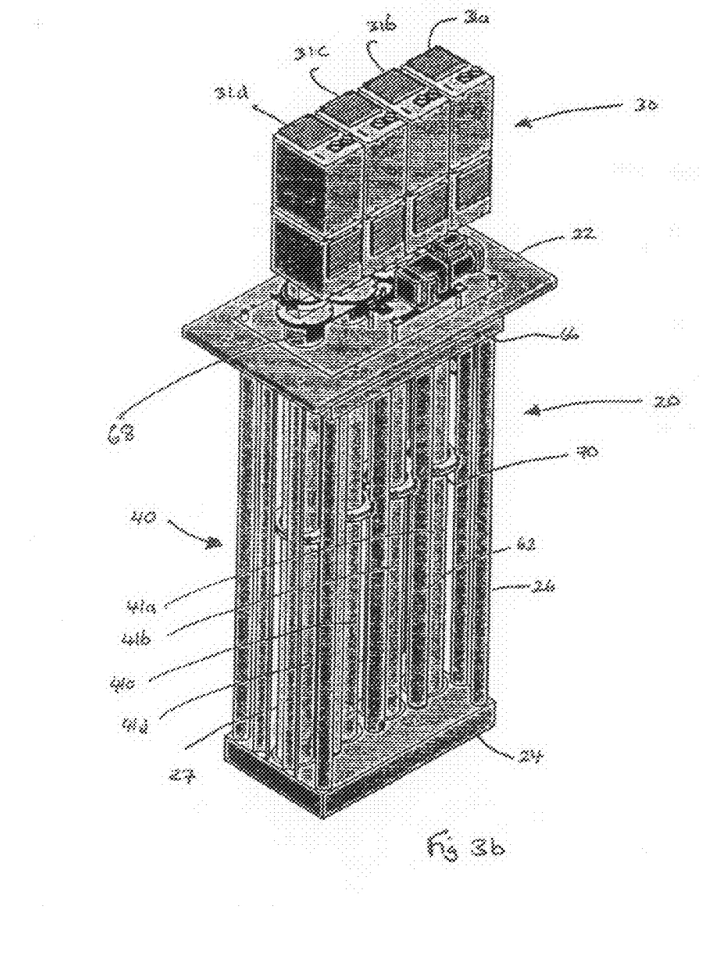
Figure 3C:
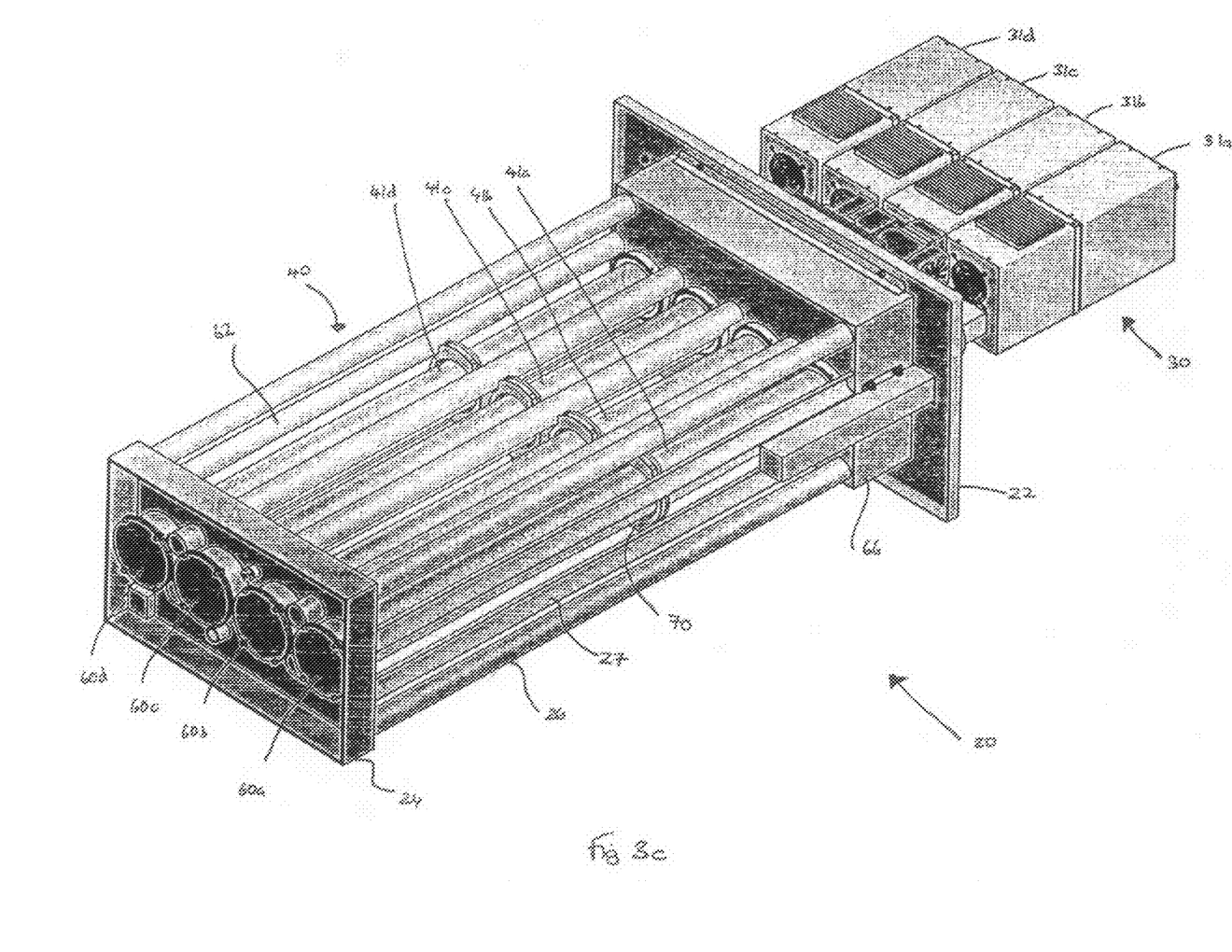

A better understanding of one elongate ultraviolet lamp unit 41 of the elongate ultraviolet lamp assembly unit 40 of each ultraviolet light source of FIGS. 1 and 3a to 4b may be had by reference to FIG. 2, which is now described in more detail.

Thus, referring to FIG. 2, the elongate ultraviolet lamp unit 41 may be seen in use to be partly submerged in a flow of water 16 defined by the concrete ditch 12. Each lamp unit 41 comprises a cluster of electrode-less ultraviolet bulbs 42 arranged in side-by-side fashion and defining a vertical elongate lamp unit axis 43. The cluster of bulbs 42 is wholly surrounded by a stainless steel mesh 50, which defines a waveguide for guiding microwave energy to the bulbs 42 from a microwave energy source (not shown in FIG. 2). The stainless steel mesh waveguide 50 itself is formed on the inner surface of an ultraviolet transparent quartz sleeve 44, which wholly surrounds the bulbs 42 and acts as a housing for both the bulbs 42 and waveguide 50. In use, the bulbs 42 are excited by microwave energy directed thereto by the waveguide 50 to emit ultraviolet radiation, which radiates out through the quartz sleeve 44 to irradiate, and hence disinfect, the water 16 flowing past.

Applicant has found that it is advantageous to provide an air cooling system to each lamp unit 41, such that controlled operating temperatures for the bulbs 42 may be maintained across varying levels of water flow 16. Thus, the base of the quartz sleeve 44 connects via seal assembly 46 to a lower air box 60 that is arranged to be individual to that lamp unit 41. The lower air box 60 receives a feed of cooling air through pipe 62, which in turn, is fed (via common upper air box 66) by cooling fan 64 that draws air from the atmosphere. The lower air box 60, in turn, feeds cooling air upwards through the quartz sleeve 44 past the bulbs 42 to common upper air box 66, which ultimately expels the air to the atmosphere through exhaust vent 68. In particular embodiments, the pipe 62 and any other parts of the air cooling system may be provided with baffles, valves and other air control equipment (not shown) as are necessary to achieve a cooling air flow in a controlled fashion. Electronic control systems are also envisaged.

Referring now to FIGS. 3a to 4b, there is shown an ultraviolet light source assembly unit 20 comprising a framework defining an upper support plate 22 and a lower support plate 24 with cylindrical corner support struts 26 and half-cylindrical edge support struts 27 therebetween. The support struts 26, 27 are positioned to act as baffles to direct the water flow (as will be described in more detail with reference to FIGS. 5a and 5b). The upper support plate 22 acts to support a microwave unit assembly 30 comprising four microwave units 31a-31d arranged in linear series, and each comprising a magnetron as a microwave energy source. Between the upper 22 and lower 24 support plates is provided an elongate ultraviolet lamp assembly unit 40 comprising a corresponding linear series of four elongate lamp units 41a-41d. Each lamp unit 41 has the detailed structure as previously described in relation to FIG. 2. Each lamp unit 41 is also received by wiper plate 70, which is arranged to move up and down the outside of each lamp unit 41 for cleaning thereof. The wiper action is described in more detail hereinafter.

The upper support plate 22 may also be seen to support cooling fan 64, and the exhaust vent 68 of certain of the lamp units 41 is also visible. It will be appreciated that the microwave unit assembly 30 will be arranged for connection to a power source (e.g., main or battery-powered). As may be seen in FIG. 3c, the upper support plate 22 also carries the upper common air box 66 and the lower support plate 24 carries individual lower air boxes 60a-60d for each lamp unit 41.

Cooling cylindrical air pipe work 62 is also visible (only one pipe 62 is labeled, for clarity). The cylindrical air pipes 62 are positioned to act as baffles to direct the water flow (as will be described in more detail with reference to FIGS. 5a and 5b).

Figure 4A:
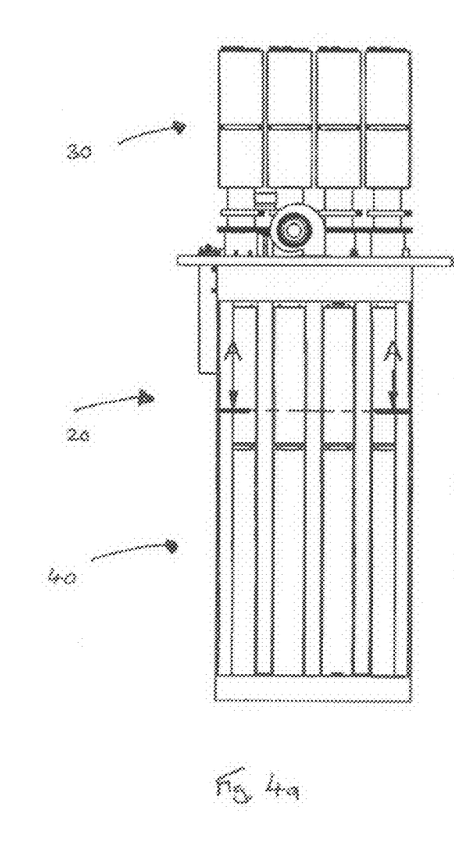
FIG. 4a shows a plan view from the front of an ultraviolet light source of FIGS. 3a to 3c.
Figure 4B:
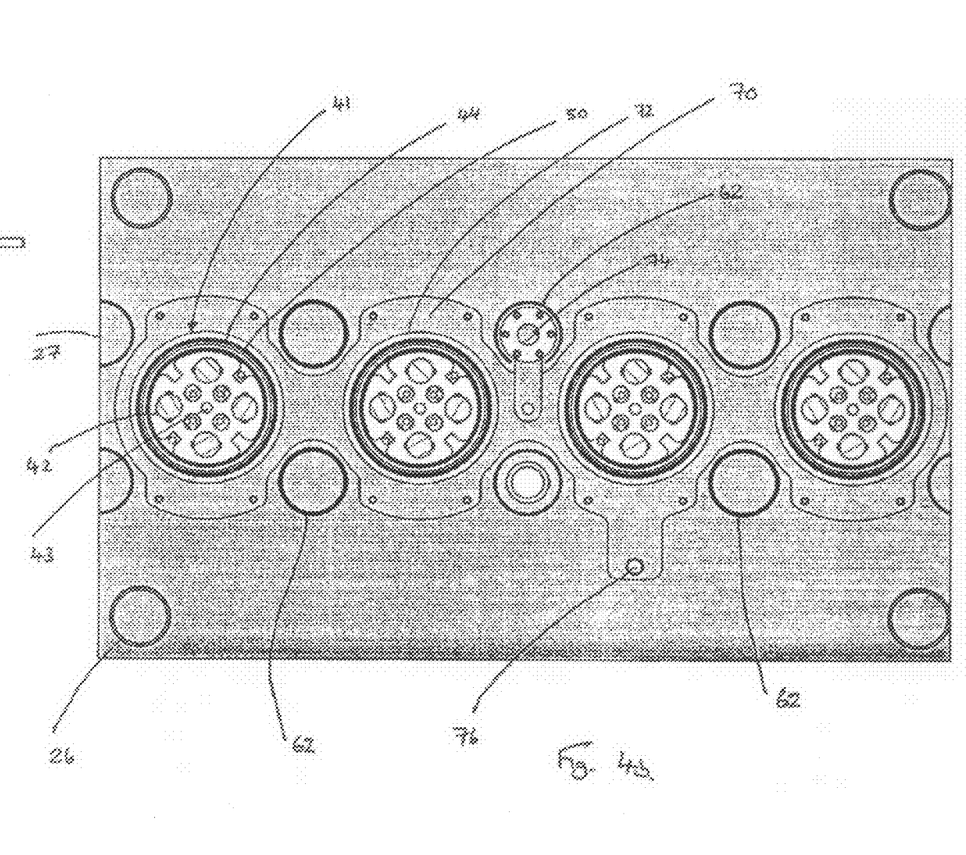

Referring now to FIGS. 4a and 4b, further details of an embodiment of each ultraviolet light source assembly unit 20 may be appreciated. Thus, each lamp unit 41 (only one of four labeled, for clarity) comprises ultraviolet transparent quartz sleeve 44 housing, which has stainless steel waveguide 50 provided to its inner surface, and acts to house a cluster of four elongate bulbs 42 arranged around elongate bulb axis 43. Each lamp unit 41 is received within circular opening 72 of wiper plate 70, wherein each circular opening 72 has stainless steel brush elements provided circumferential thereto. The wiper plate 72 may be moved up and down all of the four lamp units 41 for cleaning of the outer surface of the quartz sleeve housings 44 thereof. Movement of the wiper plate 72 is motor driven and electromagnetically controlled and, in particular, under the action of wiper lead screw 74 housed within one air pipe 62 and wiper proximity switch magnet 76. It may also be appreciated that the air pipes 62 perform a dual function by acting as both components of the air cooling system (as already described) and as guides for the movable wiper plate 72.

In a typical usage scenario herein, water 16 flows through the concrete ditch past the series arrangement of ultraviolet light source assembly units 20a-20j. Each ultraviolet lamp unit 41 receives microwave energy from its microwave energy unit to excite the bulbs 42 thereof to irradiate the water 16 flowing past and thereby acts to disinfect it. The cooling air system is used to prevent the bulbs 42 from over-heating, and its operation is typically controlled by an electronic control system, which continuously monitors the temperature within each lamp unit 41. Periodically, the wiper plate 70 is moved up and down each lamp unit 41 to clean the surface thereof. When not in use, the wiper plate 70 is held above the water line to prevent fouling thereof.

Figure 5A:
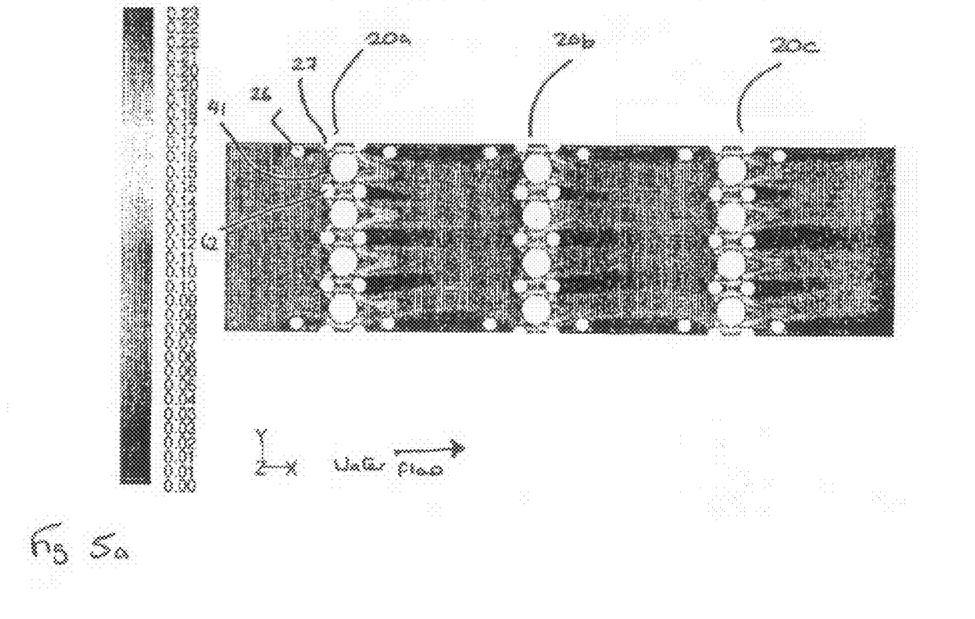
FIGS. 5a and 5b show flow diagrams of water flow past a water disinfection apparatus herein.
Figure 5B:
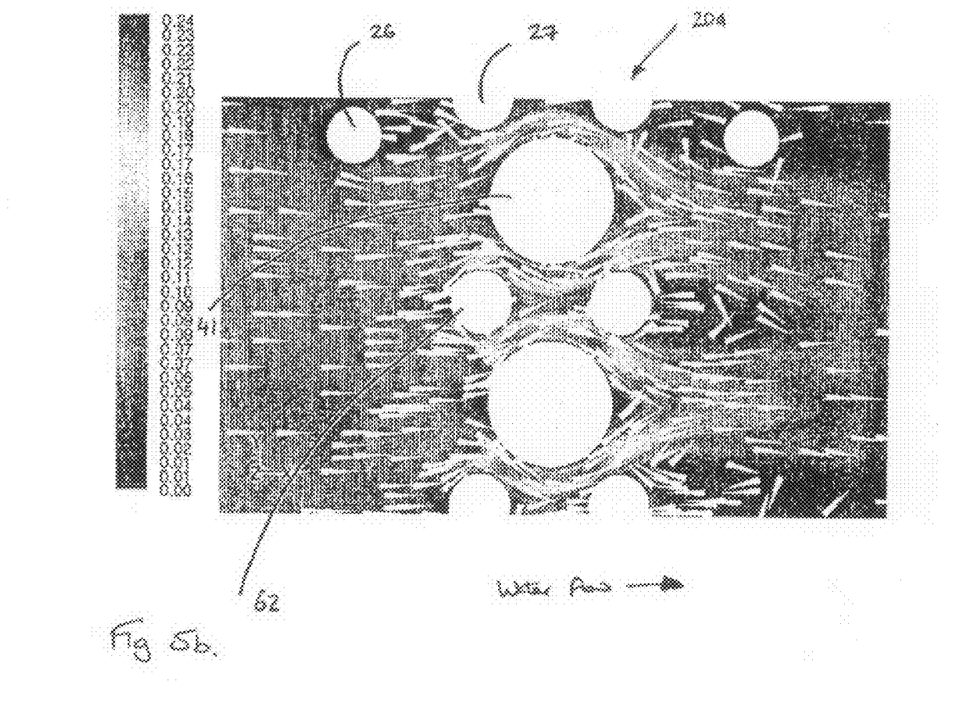

Applicant has found that it is advantageous to employ one or more baffles 26, 62 to direct water flow to each elongate lamp unit 41. FIG. 5a shows the water flow diagram obtained when water flows past a series of ultraviolet light source assembly units 20a-20c herein. FIG. 5b shows in more detail the water flow diagram obtained when water flows past one of the ultraviolet light source assembly units 20a. Thus, the baffle action of the cylindrical corner support struts 26, half-cylindrical side support struts 27 and cylindrical air pipes 62 (only one labeled, for clarity) is to direct the water flow around the lamp unit 41.

Although the foregoing description contains many specifics, these are not to be construed as limiting the scope of the present invention, but merely as providing certain representative embodiments. Similarly, other embodiments of the invention can be devised that do not depart from the spirit or scope of the present invention. The scope of the invention is, therefore, indicated and limited only by the appended claims and their legal equivalents, rather than by the foregoing description. All additions, deletions, and modifications to the invention, as disclosed herein, which fall within the meaning and scope of the claims, are encompassed by the present invention.

What is claimed is:

1. A water disinfection apparatus comprising
a channel for defining a flow of water;
plural ultraviolet light sources, each ultraviolet light source comprising:
one or more elongate lamp units comprising at least one ultraviolet bulb and defining an elongate lamp unit axis, the lamp units perpendicular to the flow of water, the lamp units disposed vertically between an upper support plate and a lower support plate, wherein in use at least part of the elongate lamp unit encounters the flow of water;

a quartz sleeve arranged to enclose the at least one ultraviolet bulb; and one or more microwave units comprising a microwave energy source for exciting the at least one ultraviolet bulb, wherein the one or more microwave units positioned on an upper surface of the upper support plate; and a cooling system for the lamp units, the cooling system comprising:

a fan positioned above the upper support plate;

an upper air box commonly shared among the one or more lamp units, the upper air box adapted to receive a feed of cooling air from the fan;

a cylindrical air pipe for downwardly transporting the cold air feed from the common upper air box; and one or more lower air boxes adapted for receiving the cold air feed from the cylindrical air pipe, the one or more lower air boxes sealably coupled to the quartz sleeve enclosing the ultraviolet bulbs, each lower air box further adapted for upwardly transporting the cold air feed through the quartz sleeve enclosing the ultraviolet bulbs;

wherein the upper support plate comprises the common upper air box and the lower support plate comprises at least one lower air box for each lamp unit.

2. The water disinfection apparatus of claim 1, wherein the quartz sleeve enclosing the ultraviolet bulbs directs the cold air feed from the one or more lower air boxes to the common upper air box.

3. The water disinfection apparatus of claim 1, further comprising an exhaust vent positioned on the upper surface of the upper support plate, the exhaust vent connected to the common upper air box.

4. The water disinfection apparatus of claim 1, wherein the cylindrical air pipe is arranged in between the upper support plate and the lower support plate.

5. The water disinfection apparatus of claim 1, wherein the cylindrical air pipe further comprises baffles and valves, the baffles and valves adapted to control the cold air feed.

6. The water disinfection apparatus of claim 1, further comprising electronic control systems for controlling the cold air feed.

7. The water disinfection apparatus of claim 1, further comprising one or more support struts positioned between the upper support and the lower support plate.

8. The water disinfection apparatus of claim 7, wherein the support struts further comprise one or more cylindrical corner support struts and one or more half-cylindrical edge support struts.

9. The water disinfection apparatus of claim 7, wherein the support struts are positioned to act as baffles for directing a flow of water to the lamp unit.

10. The water disinfection apparatus of claim 1, wherein each lamp unit further comprises a wiper plate.

11. The water disinfection apparatus of claim 1, wherein each lamp unit comprises all optically transparent waveguide for guiding microwave energy to the one or more ultraviolet bulbs, the waveguide enclosing the one or more ultraviolet bulb.

12. The water disinfection apparatus of claim 11, wherein the waveguide is located on an inside surface of the quartz sleeve.

13. The water disinfection apparatus of claim 11, wherein the waveguide further comprises a conducting mesh.

14. The water disinfection apparatus of claim 1, wherein the dominant wavelength of the one or more lamp units is from 160 to 370 nm.

15. The water disinfection apparatus of claim 1, wherein in use the microwave units are positioned above the flow of water.

16. A method of water disinfection comprising:

placing a water disinfection apparatus in an open channel of water, the water disinfection apparatus comprising a lamp assembly, the lamp assembly further comprising; an upper support plate and a lower support plate; one or more elongate ultraviolet lamp units vertically disposed between the upper support plate and the lower support plate, each lamp unit comprising one or more ultraviolet bulbs; the upper support plate further comprising one or more microwave units, the one or more microwave units positioned on an upper surface of the upper support plate; an upper air box commonly shared by the one or more lamp units; and a cooling fan adapted to provide a cold air feed to the common upper air box; and the lower support plate further comprising a lower air box for each lamp unit; and wherein in use the one or more lamp units are oriented vertically to a flow of water;

directing the flow of water to the one or more lamp units, the water directed to the lamp units by one or more baffles positioned between the upper support plate and the lower support plate; and providing power to the microwave units to release microwave energy wherein the microwave energy excites the ultraviolet bulbs to emit ultraviolet radiation.

17. The method of water disinfection of claim 16, further comprising cooling the one or more lamp units by directing the cold air feed from the common upper air box to a cylindrical air pipe positioned between the upper support plate and the lower support plate.

18. The method of water disinfection of claim 17, further comprising delivering the directed cold air feed to the lower air box.

19. The method of water disinfection of claim 18, further comprising re-directing the cold air feed delivered to the lower air box to the common upper air box through a quartz sleeve enclosing the ultraviolet bulbs.

20. The method of water disinfection of claim 19, further comprising expelling the re-directed cold air feed from the common upper air box through an exhaust vent provided on the upper surface of the upper support plate.

* * * * *